US009281867B2

(12) United States Patent
Huang et al.

(10) Patent No.: US 9,281,867 B2
(45) Date of Patent: Mar. 8, 2016

(54) POWER LINE COMMUNICATION DEVICE SWITCHABLE BETWEEN NOISE DETECTING AND FILTERING FUNCTIONS

(71) Applicant: D-Link Corporation, Taipei (TW)

(72) Inventors: Jun-Hao Huang, Taipei (TW); Wei-Chung Hsu, Taipei (TW); Ming-Han Liu, Taipei (TW)

(73) Assignee: D-LINK CORPORATION, Taipei (TW)

( * ) Notice: Subject to any disclaimer, the term of this patent is extended or adjusted under 35 U.S.C. 154(b) by 455 days.

(21) Appl. No.: 13/944,959

(22) Filed: Jul. 18, 2013

(65) Prior Publication Data

US 2014/0328417 A1 Nov. 6, 2014

(30) Foreign Application Priority Data

May 6, 2013 (TW) .............................. 102116077 A

(51) Int. Cl.
*H04B 3/54* (2006.01)
*H04B 3/56* (2006.01)

(52) U.S. Cl.
CPC .. *H04B 3/54* (2013.01); *H04B 3/56* (2013.01); *H04B 2203/5491* (2013.01)

(58) Field of Classification Search
CPC ..................................... H04B 3/56; H04B 3/54
USPC ........................................................ 375/257
See application file for complete search history.

(56) References Cited

U.S. PATENT DOCUMENTS

| 2002/0063474 | A1* | 5/2002 | Wasaki | H04B 3/56 307/89 |
| 2005/0285720 | A1* | 12/2005 | Cope | G02B 6/483 370/419 |
| 2008/0304577 | A1* | 12/2008 | Koga | H04B 3/54 375/257 |
| 2008/0316004 | A1* | 12/2008 | Kiko | H04B 3/56 340/12.34 |
| 2010/0194405 | A1* | 8/2010 | Yu | G01R 29/26 324/613 |
| 2010/0195744 | A1* | 8/2010 | Schwager | H04B 3/54 375/257 |
| 2012/0300820 | A1* | 11/2012 | Eitel | H04B 3/54 375/222 |
| 2014/0269868 | A1* | 9/2014 | Werner | H04B 3/54 375/224 |

* cited by examiner

*Primary Examiner* — Jared Fureman
*Assistant Examiner* — James P Evans
(74) *Attorney, Agent, or Firm* — Bacon & Thomas, PLLC

(57) ABSTRACT

The present invention is to provide a PLC device, which includes a power receiving port connected to a power supply for receiving a power signal and a network signal carried by the power signal; a filtering unit having a first end connected to the power receiving port; a power output port connected to a second end of the filtering unit and a load, respectively, for supplying the power signal to the load while the filtering unit filters out noise generated in the power signal by the load; a switching unit having two connecting ends connecting to the first and second ends, respectively, and a control end switchable between the two connecting ends; and a processing unit connected to the control end and including a bridge module for receiving and then transmitting the network signal to a network apparatus, and a detection module for detecting the level of the noise.

9 Claims, 3 Drawing Sheets

POWER LINE COMMUNICATION DEVICE SWITCHABLE BETWEEN NOISE DETECTING AND FILTERING FUNCTIONS

FIELD OF THE INVENTION

The present invention relates to a PLC device, more particularly to a PLC device switchable between noise detecting and filtering functions, which has a switching unit capable of being switched to whether or not allow power signal and network signal transmitted between a power output port (e.g., a socket) and a processing unit to pass through a filtering unit, wherein the processing unit is able to detect the level of noise generated in the power signal by a load, and the filtering unit is able to filter out the noise generated by the load. Thus, the quality and stability of transmission of the network signal are ensured.

BACKGROUND OF THE INVENTION

Recently, with rapid dissemination of information and the fast development of electronic technology, the Internet has become an information collection and distribution center accessible anywhere in the world. According to statistics, the amount of information generated by global media networks in 2003 totals five billion gigabytes (GB, or $10^9$ bytes), which is equivalent to the amount of information generated by man in the past five thousand years. From 2003 onward, network technology has advanced even faster. Nowadays, it is estimated that network users around the world generate at least 100 billion entries of Internet search records each month—a compelling evidence of people's dependence on networks. Seeing that networks are almost indispensible in modern life, be it for playing online games, marketing, travel planning, making medical appointments, or even inquiring about bus arrival time, the related industry has endeavored to increase the convenience and stability of networks in various environments.

Generally speaking, one who wishes to connect to the Internet and use related services must connect an Ethernet cable to a computer device so that Internet connection can be correctly made through the routing function of the computer device. Thus, the extent over which Ethernet cables are distributed in a place determines, in a way, the area where network connection is possible. With the advent of mobile electronic devices (e.g., laptop computers, smart phones, personal digital assistants, and so on), however, mechanisms for wireless network communication have gradually matured and been widely used, making it possible to make Internet connection without limitation by the distribution of physical lines. Nevertheless, wireless signals attenuate significantly when passing through a concrete wall or a human body. If wireless signals are used where there are plenty of such barriers, signal transmission may be interrupted frequently; in other words, the stability of signal transmission is not guaranteed.

In view of the difficulty of Ethernet cable distribution and the adverse effects of the aforesaid barriers on wireless network signals, power line communication (PLC) technology was developed. As its name suggests, power line communication relies on existing power lines in a building to transmit network signals. In order to apply PLC technology, PLC devices (e.g., network bridges) are required, which are connected to power line sockets at different locations to convert network signals and thereby enable transmission of network signals via power lines. Now that power lines are essential to each building, using power lines as the backbone medium for network transmission not only spares the trouble of cable distribution, but also reduces the cost and time of construction. Also, the integrity of the interior design of a building need not be compromised. In a nutshell, PLC is an ideal solution to the aforesaid problems. In practice, however, the PLC technology has its own problems, two major ones of which are detailed as follows:

(1) Taking up extra socket space: A typical power line socket outlet has two or more sockets, but the spacing between each two adjacent sockets is quite limited and far smaller than the size of a PLC device. Therefore, when a PLC device is connected to such a socket outlet, chances are it takes up the space of more than one socket, preventing the socket outlet from supplying power to other appliances in that area. Although a power strip can be used to solve this problem, the surge protection elements in a power strip tend to lower the signal intensity of the PLC device significantly, for the surge protection elements, which are provided to ensure safety, will identify network signals as surges.

(2) Noise interference: As a power line is designed solely as a power-supplying medium in the first place and is not configured for high-quality signal transmission, the voltage carried by a power line will fluctuate with the load of the electronic device being powered or even generate electromagnetic radiation. The electronic device being powered may also generate noise. All the foregoing interferes with network signals. A minor interference can lower the quality of network signal transmission; a significant interference, on the other hand, can destroy network signals completely.

One solution to the aforesaid problem is to install a filter in the PLC device, so as for the filter to filter out noise in the power line. However, since not all electronic devices generate a high level of noise, one who has bought a PLC device equipped with a filter can never know if the filter provides the expected filtering effect, or which electronic device should the PLC device be connected to in order to filter out the strongest source of noise. Hence, the issue to be addressed by the present invention is to design a PLC device which not only can effectively detect noise generated by various electronic devices, but also can filter out the noise detected, thereby increasing the quality of a network environment.

BRIEF SUMMARY OF THE INVENTION

In view of the fact that a conventional PLC device tends to occupy extra socket space and cannot identify the source of noise, the inventor of the present invention incorporated years of practical experience into repeated tests and continual improvements and finally succeeded in developing a PLC device which can be switched between noise detecting and filtering functions. This PLC device is intended to facilitate the creation of a good network environment.

It is an object of the present invention to provide a PLC device switchable between noise detecting and filtering functions. The PLC device includes a power receiving port (e.g., a plug), a filtering unit, a power output port (e.g., a socket), a switching unit, and a processing unit. The power receiving port has one end connected to a power supply unit (e.g., an electrical socket) in order to receive a power signal transmitted from the power supply unit and a network signal carried by the power signal. The filtering unit has a first end connected to the other end of the power receiving port. The power output port has one end connected to a second end of the filtering unit and the other end electrically connected to a load; thus, the power output port can supply the power signal from the filtering unit to the load while the filtering unit filters out noise generated in the power signal by the load. The switching unit has a first connecting end connected to the first end of the filtering unit and a second connecting end connected to the second end of the filtering unit. The switching unit further has a control end switchable between a state in which the control end is in conduction with only the first connecting end and a state in which the control end is in conduction with only the second connecting end. The processing unit is connected to the control end and includes a bridge module and a detection module. Once the control end is switched into conduction with the first connecting end, the bridge module receives the network signal carried by the power signal and transmits the network signal to a network apparatus either through a physical connecting line or wirelessly. Now that the filtering unit has filtered out the noise generated in the power signal by the load, the network signal is kept from interference by the noise and has its accuracy maintained. Conversely, once the control end is switched into conduction with the second connecting end, the detection module detects the level of the noise generated in the power signal by the load. According to the above, one who has connected the PLC device to the power supply unit in order to transmit the power signal and the network signal to the load and the network apparatus respectively may, to start with, switch the control end of the switching unit into conduction with the second connecting end; thus, by means of the detection module, the user can know whether the load generates excessive noise. The user may then switch the control end of the switching unit into conduction with the first connecting end, so as for the filtering unit to filter out the noise generated by the load. Thus, the quality and stability of transmission of the network signal are ensured.

It is another object of the present invention to provide another implementation mode of the foregoing PLC device, wherein the PLC device includes a power receiving port, a filtering unit, a switching unit, a power output port, and a processing unit. The power receiving port has one end connected to a power supply unit in order to receive a power signal and a network signal. The filtering unit has a first end connected to the other end of the power receiving port. The switching unit has a first connecting end connected to the first end of the filtering unit and a second connecting end connected to a second end of the filtering unit. The switching unit further has a control end switchable between a state in which the control end is in conduction with only the first connecting end and a state in which the control end is in conduction with only the second connecting end. The power output port has one end connected to the control end and the other end connected to a load. The processing unit is connected to the first end of the filtering unit and includes a detection module and a bridge module. Once the control end is switched into conduction with the first connecting end, the detection module detects the level of noise generated in the power signal by the load and shows the detection result. Conversely, once the control end is switched into conduction with the second connecting end, the bridge module receives the network signal, which is carried by the power signal, and transmits the network signal to a network apparatus either through a physical connecting line or wirelessly. Now that the filtering unit has filtered out the noise generated in the power signal by the load, the network signal is kept from interference by the noise and has its accuracy maintained.

BRIEF DESCRIPTION OF THE SEVERAL VIEWS OF THE DRAWINGS

The techniques employed by, and the structural features and objects of, the present invention will be best understood by referring to the following detailed description of some illustrative embodiments in conjunction with the accompanying drawings, in which.

DETAILED DESCRIPTION OF THE INVENTION

Figure 1:
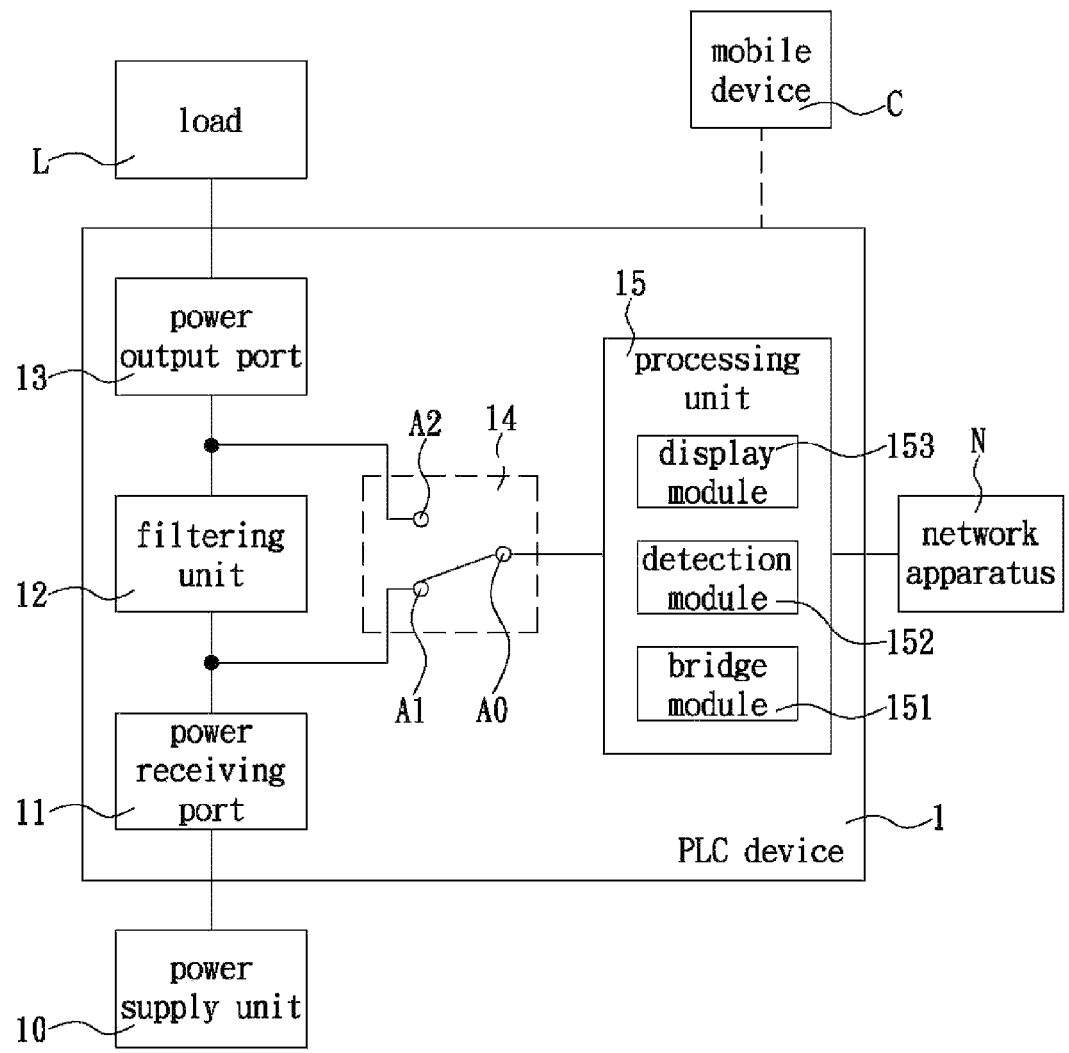
FIG. 1 is a schematic diagram of the PLC device according to the first preferred embodiment of the present invention.

The present invention discloses a PLC device switchable between noise detecting and filtering functions. Referring to FIG. 1 for the first preferred embodiment of the present invention, the PLC device 1 includes a power receiving port 11, a filtering unit 12, a power output port 13, a switching unit 14, and a processing unit 15. The power receiving port 11, which may be configured as a plug, has one end connected to a power supply unit 10 (e.g., a power line socket) in order to receive a power signal transmitted from the power supply unit 10 and a network signal carried by the power signal.

As shown in FIG. 1, the filtering unit 12 has a first end connected to the opposite end of the power receiving port 11 and has a second end connected to one end of the power output port 13. Thus, through the filtering unit 12, the power output port 13 can receive the power signal from the power receiving port 11. The opposite end of the power output port 13 is electrically connect to a load L (e.g., an electric fan, a hair dryer, a computer, or a like electronic apparatus) and may be a socket having the same connection specifications as the power supply unit 10. The switching unit 14 includes a first connecting end A1, a second connecting end A2, and a control end A0. The first connecting end A1 is connected to the first end of the filtering unit 12, the second connecting end A2 is connected to the second end of the filtering unit 12, and the control end A0 is selectively connectable to only the first connecting end A1 or only the second connecting end A2.

The processing unit 15 is connected to the control end A0 of the switching unit 14 and includes a bridge module 151 and a detection module 152. Once the control end A0 of the switching unit 14 is switched (e.g., by a physical control switch external of the PLC device 1) into connection with the first connecting end A1, the filtering unit 12 is located between the power output port 13 and the processing unit 15; therefore, any noise generated in the power signal by operation of the load L will be filtered out by the filtering unit 12 and kept from affecting the processing unit 15. In this state, the bridge module 151 of the processing unit 15 can, after receiving the power signal transmitted from the power receiving port 11, correctly convert the power signal into the network signal and deliver the network signal to an external network apparatus N through a physical connecting line (e.g., an Ethernet cable, a coaxial cable, a power line, or a like connection interface). Alternatively, the bridge module 151 delivers the network signal to the network apparatus N by a wireless transmission technique (e.g., by a wireless transmission protocol like ZigBee® or Z-Wave, wherein ZigBee® is synonymous with IEEE 802.15.4 and is a short-range, low-power consumption, wireless communication technique).

Conversely, once the control end A0 of the switching unit 14 is switched into connection with the second connecting end A2, the power output port 13 is directly connected to the processing unit 15; in other words, the filtering unit 12 in this state is not located in the connection path between the power output port 13 and the processing unit 15. This allows the detection module 152 to receive the power signal transmitted from the load end (e.g., the power output port 13), detect the level of noise generated in the power signal by the load L, and then show the detection result in order for the user to know the noise level. Hence, when it is desired to lay out a power line network in a place where there are a plurality of electronic apparatuses, the control end A0 of the switching unit 14 can be switched into connection with the second connecting end A2, and then the PLC device 1 is sequentially connected to each electronic apparatus. By so doing, the level of noise generated by each electronic apparatus during operation can be known. The PLC device 1 is eventually applied to the electronic apparatus generating the highest level of noise, with the control end A0 switched into connection with the first connecting end A1 in order to filter out the strongest source of noise in that place.

It should be pointed out that the first preferred embodiment of the present invention can be so configured that the connection state of the control end A0 of the switching unit 14 is switched via a physical control switch on the PLC device 1, and that the processing unit 15 further includes a display module 153 connected to the detection module 152 and configured for displaying the value of the noise detected. In practice, however, the PLC device 1 may also be wirelessly connected to a mobile device C (or a personal computer, display apparatus, or other types of electronic devices; the mobile device C being provided in this embodiment to emphasize the convenience of the PLC device 1 in terms of use and operation), allowing a user to switch the switching unit 14 by way of the mobile device C (e.g., by a specific software program installed in the mobile device C) or view, through the mobile device C, the noise level detected by the detection module 152. The display module 153 may also be configured to compare, and thereby obtain relative values of, noises of different time points and then project different color light to inform the user of the noise level detected (e.g., red light for a high noise level, orange light for a medium noise level, and green light for a low noise level).

Figure 2:
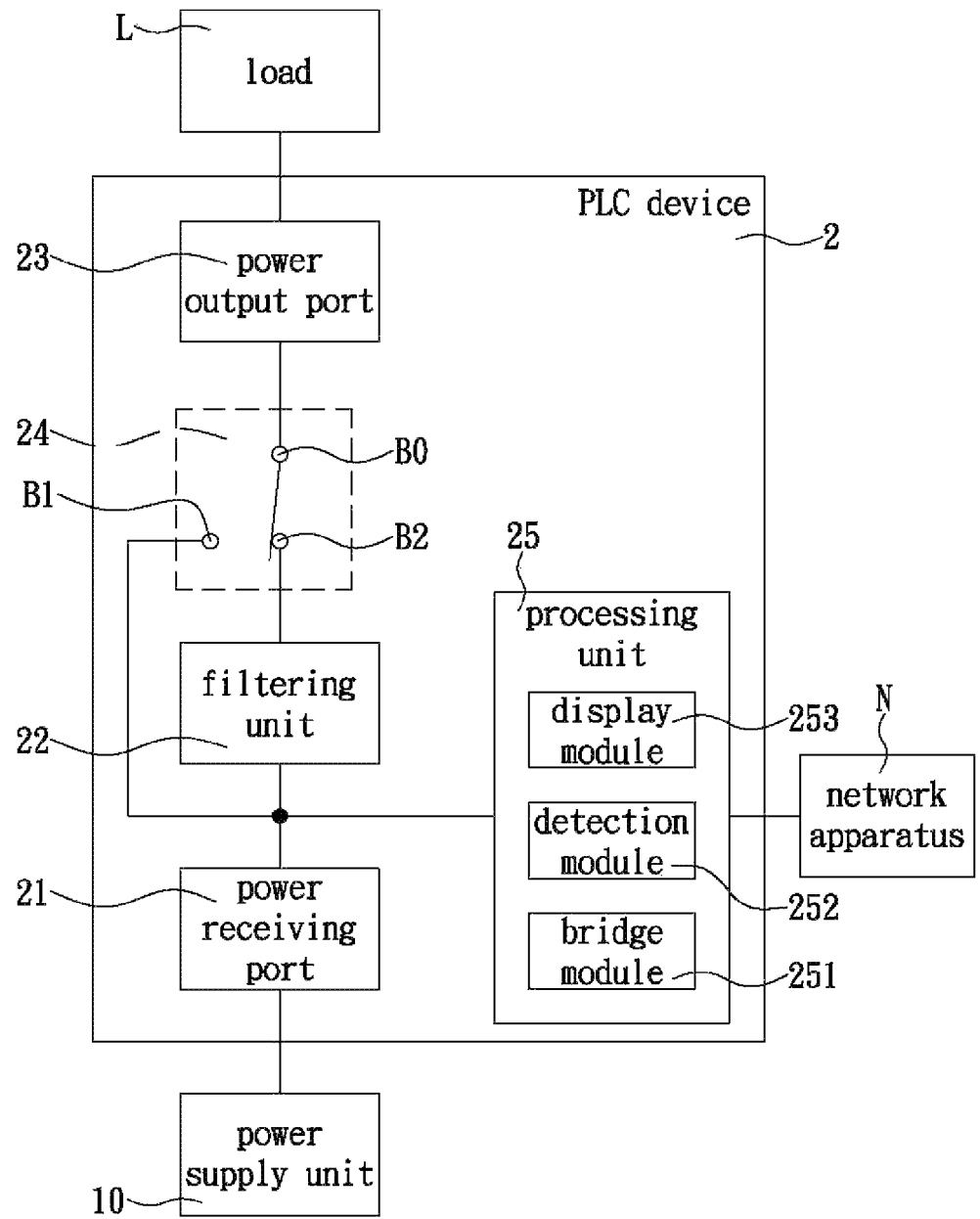
FIG. 2 is a schematic diagram of the PLC device according to the second preferred embodiment of the present invention.

FIG. 2 shows the second preferred embodiment of the present invention, in which the PLC device 2 also includes a power receiving port 21, a filtering unit 22, a power output port 23, a switching unit 24, and a processing unit 25. One end of the power receiving port 21 is connected to a power supply unit 10 in order to receive a power signal transmitted therefrom and a network signal carried by the power signal.

The filtering unit 22 has a first end connected to the opposite end of the power receiving port 21. The switching unit 24 includes a first connecting end B1, a second connecting end B2, and a control end B0. The first connecting end B1 is connected to the first end of the filtering unit 22, the second connecting end B2 is connected to a second end of the filtering unit 22, and the control end B0 can be switched to a state in which it is in conduction with only the first connecting end B1 or the second connecting end B2. The power output port 23 has one end connected to the control end B0 and the opposite end connected to a load L.

The processing unit 25 is connected to the first end of the filtering unit 22 and includes a bridge module 251, a detection module 252, and a display module 253. Once the control end B0 is switched into conduction with the first connecting end B1, the bridge module 251 can receive the network signal transmitted from the power receiving port 21; however, since both the power output port 23 and the processing unit 25 in this state are connected to the first end of the filtering unit 22, the filtering unit 22 cannot filter out noise generated by the load L, meaning the efficiency with which the bridge module 251 obtains the network signal by conversion will be affected by the noise. Meanwhile, the detection module 252 receives the power signal from the load end, detects the level of noise generated in the power signal by the load L, and displays the current noise level via the display module 253.

Conversely, once the control end B0 of the switching unit 24 is switched into conduction with the second connecting end B2, the power output port 23 and the processing unit 25 are connected to each other by the filtering unit 22, allowing the filtering unit 22 to filter out the noise generated in the power signal by the load L. Thus, the network signal is prevented from interference by the noise, and the accuracy of the network signal is ensured. In other words, after receiving the power signal transmitted from the power receiving port 21, the bridge module 251 can correctly convert the power signal to obtain the network signal carried thereby. The network signal is then transmitted from the bridge module 251 to a network apparatus either through a physical connecting line or wirelessly.

In can be known from the above that the major difference between the foregoing two embodiments of the present invention lies in the location of the switching unit 14, 24. Nevertheless, both embodiments have the same effects and objects, i.e., to connect the power output port 13, 23 to the processing unit 15, 25 selectively through the filtering unit 12, 22, thereby switching on or off the noise detecting function. Besides, it should be noted that the two embodiments have different circuit configurations. In the first preferred embodiment, the PLC device 1 enters a noise detecting state when the control end A0 of the switching unit 14 is switched into connection with the first connecting end A1; in the second preferred embodiment, however, the PLC device 2 enters a filtering state when the control end B0 of the switching unit 24 is connected to the first connecting end B1.

Moreover, the PLC device 1, 2 in each of the foregoing two embodiments is provided with the power output port 13, 23 so that the load L can receive the power signal through the power output port 13, 23 and operate normally while the PLC device 1, 2 receives the network signal through the processing unit 15, 25. Hence, even if the socket on the power supply unit 10 is occupied by the PLC device 1, 2, the load L can still obtain electricity via the power output port 13, 23. It can be known from the above that the power output port 13, 23 in the aforesaid embodiments serves mainly to add to the convenience of the present invention but is not essential to implementation of the present invention. Please refer to FIG. 3 for the third preferred embodiment of the present invention. The PLC device 3 includes a power receiving port 31, a filtering unit 32, a switching unit 34, and a processing unit 35. The power receiving port 31 has a first end connected to the power supply unit 10 so as to receive a power signal transmitted from the power supply unit 10 and a network signal carried by the power signal.

The filtering unit 32 has a first end connected to a second end of the power receiving port 31. The switching unit 34 includes a first connecting end C1, a second connecting end C2, and a control end C0. The first connecting end C1 is connected to the first end of the filtering unit 32, the second connecting end C2 is connected to a second end of the filtering unit 32, and the control end C0 is switchable to a state in which it is in conduction with only the first connecting end C1 or the second connecting end C2. The processing unit 35 is connected to the control end C0 and includes a bridge module 351 and a detection module 352. Once the control end C0 of the switching unit 34 is in conduction with the first connecting end C1, the processing unit 35 is directly connected to the second end of the power receiving port 31 so as for the detection module 352 to detect the level of noise in the power signal. Conversely, once the control end C0 of the switching unit 34 is in conduction with the second connecting end C2, the processing unit 35 is connected to the power receiving port 31 via the filtering unit 32, allowing the filtering unit 32 to filter out the noise in the power signal, and the bridge module 351 to correctly convert the power signal received from the power receiving port 31 into the network signal and then transmit the network signal to a network apparatus N.

Figure 3:
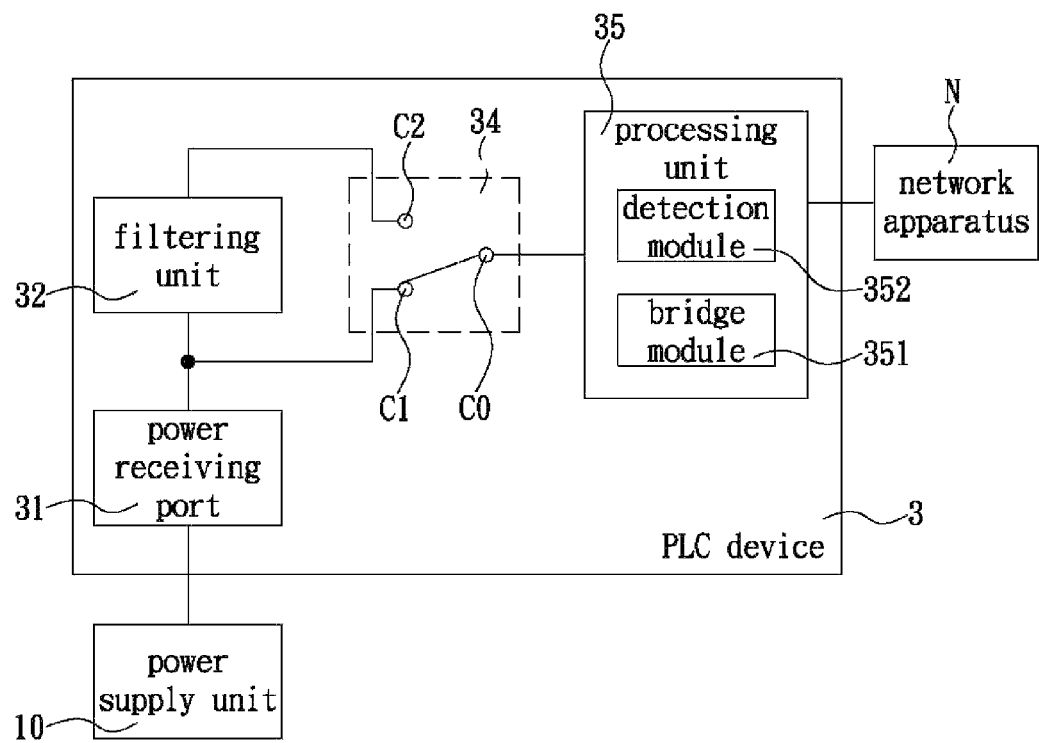
FIG. 3 is a schematic diagram of the PLC device according to the third preferred embodiment of the present invention.

In a network composed of power lines, referring to FIGS. 1~3, not only may the load L generate noise as in the first and the second preferred embodiments, but also the power signal transmitted from the power supply unit 10 may contain noise generated by other remote electronic apparatuses. Therefore, in the third preferred embodiment of the present invention, the PLC device 3 uses the filtering unit 32 to filter out noise coming from the power supply unit 10, too. One who wishes to receive a network signal through the PLC device 3 can switch the control end C0 of the switching unit 34 into connection with the first connecting end C1 and, by connecting the power receiving port 31 to each of various electronic apparatuses around the PLC device 3, identify the main source of noise based on the noise levels detected by the detection module 352. Then, the control end C0 of the switching unit 34 is switched into connection with the second connecting end C2, and the PLC device 3 is connected to the electronic apparatus generating the most noise, with a view to receiving the network signal and eliminating the influence of noise in the power line network.

While the invention herein disclosed has been described by means of specific embodiments, numerous modifications and variations could be made thereto by those skilled in the art without departing from the scope of the invention set forth in the claims.

What is claimed is:

1. A power line communication (PLC) device switchable between noise detecting and filtering functions, comprising:
    a power receiving port having an end connected to a power supply unit so as to receive a power signal transmitted from the power supply unit and a network signal carried by the power signal;
    a filtering unit having a first end connected to an opposite end of the power receiving port;
    a power output port having an end connected to a second end of the filtering unit and an opposite end electrically connected to a load so as to provide to the load the power signal transmitted from the filtering unit, and so as for the filtering unit to filter out noise generated in the power signal by the load;
    a switching unit comprising a first connecting end, a second connecting end, and a control end, the first connecting end being connected to the first end of the filtering unit, the second connecting end being connected to the second end of the filtering unit, the control end being switchable to a state in which the control end is in conduction with only the first connecting end or the second connecting end; and
    a processing unit connected to the control end and comprising a bridge module and a detection module, wherein when the control end of the switching unit is in conduction with the first connecting end, the noise generated in the power signal by the load is filtered out by the filtering unit, so as for the bridge module to, after receiving the power signal transmitted from the power receiving port, correctly convert the power signal into the network signal and transmit the network signal to a network apparatus; and when the control end of the switching unit is in conduction with the second connecting end, the detection module receives the power signal transmitted from the power output port and detects a level of the noise generated in the power signal by the load.

2. The power line communication device of claim 1, wherein the processing unit further comprises a display module, the display module being connected to the detection module so that the detection module can, after detecting the level of the noise generated in the power signal by the load, display a detection result through the display module.

3. The power line communication device of claim 2, wherein the bridge module is connected to the network apparatus through a physical connecting line so as to deliver the network signal to the network apparatus.

4. The power line communication device of claim 2, wherein the bridge module delivers the network signal to the network apparatus by wireless transmission.

5. A power line communication (PLC) device switchable between noise detecting and filtering functions, comprising:
    a power receiving port having an end connected to a power supply unit so as to receive a power signal transmitted from the power supply unit and a network signal carried by the power signal;
    a filtering unit having a first end connected to an opposite end of the power receiving port;
    a switching unit comprising a first connecting end, a second connecting end, and a control end, the first connecting end being connected to the first end of the filtering unit, the second connecting end being connected to a second end of the filtering unit, the control end being switchable to a state in which the control end is in conduction with only the first connecting end or the second connecting end;
    a power output port having an end connected to the control end and an opposite end connected to a load; and
    a processing unit connected to the first end of the filtering unit and comprising a detection module and a bridge module, wherein once the control end of the switching unit is switched into conduction with the first connecting end, the detection module receives the power signal transmitted from the power output port and detects a level of noise generated in the power signal by the load; and once the control end is switched into conduction with the second connecting end, the noise generated in the power signal by the load is filtered out by the filtering unit, so as for the bridge module to, after receiving the power signal transmitted from the power receiving port, correctly convert the power signal into the network signal and transmit the network signal to a network apparatus.

6. The power line communication device of claim 5, wherein the processing unit further comprises a display module, the display module being connected to the detection module so that the detection module can, after detecting the level of the noise generated in the power signal by the load, display a detection result through the display module.

7. The power line communication device of claim 6, wherein the bridge module is connected to the network apparatus through a physical connecting line so as to deliver the network signal to the network apparatus.

8. The power line communication device of claim 6, wherein the bridge module delivers the network signal to the network apparatus by wireless transmission.

9. A power line communication (PLC) device switchable between noise detecting and filtering functions, comprising:

a power receiving port having an end connected to a power supply unit so as to receive a power signal transmitted from the power supply unit and a network signal carried by the power signal;

a filtering unit having a first end connected to an opposite end of the power receiving port;

a switching unit comprising a first connecting end, a second connecting end, and a control end, the first connecting end being connected to the first end of the filtering unit, the second connecting end being connected to a second end of the filtering unit, the control end being switchable to a state in which the control end is in conduction with only the first connecting end or the second connecting end; and a processing unit connected to the control end and comprising a bridge module and a detection module, wherein when the control end of the switching unit is in conduction with the first connecting end, the processing unit is directly connected to the power receiving port, thus allowing the detection module to detect a level of noise in the power signal; and when the control end of the switching unit is in conduction with the second connecting end, the processing unit is connected to the power receiving port through the filtering unit so as for the filtering unit to filter out the noise in the power signal, and for the bridge module to, after receiving the power signal transmitted from the power receiving port, correctly convert the power signal into the network signal and transmit the network signal to a network apparatus.

* * * * *